United States Patent
Sprocq et al.

(10) Patent No.: US 10,180,136 B2
(45) Date of Patent: Jan. 15, 2019

(54) DUAL-SCREW MOVEMENT CONVERTER

(71) Applicant: Robert Bosch GmbH, Stuttgart (DE)

(72) Inventors: Raynald Sprocq, Esbly (FR); Chris Anderson, Paris (FR)

(73) Assignee: ROBERT BOSCH GMBH, Stuttgart (DE)

( * ) Notice: Subject to any disclaimer, the term of this patent is extended or adjusted under 35 U.S.C. 154(b) by 319 days.

(21) Appl. No.: 14/882,711

(22) Filed: Oct. 14, 2015

(65) Prior Publication Data

US 2016/0108911 A1    Apr. 21, 2016

(30) Foreign Application Priority Data

Oct. 15, 2014  (FR) ...................................... 14 59870

(51) Int. Cl.
| | | |
|---|---|---|
| *F16H 25/22* | (2006.01) | |
| *F16K 31/528* | (2006.01) | |
| *F04C 2/08* | (2006.01) | |
| *F16H 25/18* | (2006.01) | |
| *F16H 25/20* | (2006.01) | |

(52) U.S. Cl.
CPC ............ *F04C 2/084* (2013.01); *F16H 25/186* (2013.01); *F16H 25/20* (2013.01); *F16H 25/2056* (2013.01); *F16H 2025/2059* (2013.01)

(58) Field of Classification Search
CPC ........... F16H 2025/2059; F16H 25/186; F16H 25/20; F16H 25/2056; F16H 1/00; F16H 1/04; F16H 1/20; F16K 31/50; F16K 31/506; F16K 31/504; F16K 31/508
See application file for complete search history.

(56) References Cited

U.S. PATENT DOCUMENTS

| | | | | | |
|---|---|---|---|---|---|
| 1,396,259 | A | * | 11/1921 | Coryell ..................... | B66F 3/10 254/102 |
| 1,565,878 | A | * | 12/1925 | White ....................... | B66F 3/10 254/102 |
| 3,762,513 | A | * | 10/1973 | Farr ....................... | F16D 65/567 188/106 F |
| 4,867,283 | A | * | 9/1989 | Dill ........................ | B61H 15/00 188/170 |
| 5,144,851 | A | * | 9/1992 | Grimm ................... | B64C 13/36 74/89.26 |
| 6,024,422 | A | | 2/2000 | Drennen et al. | |
| 9,080,651 | B2 | * | 7/2015 | Schwarzbach .......... | B29C 45/76 |
| 2001/0029797 | A1 | | 10/2001 | Lange et al. | |

* cited by examiner

*Primary Examiner* — Audrey K Bradley
*Assistant Examiner* — Anthony Ayala Delgado
(74) *Attorney, Agent, or Firm* — Norton Rose Fulbright US LLP; Gerard Messina

(57) ABSTRACT

A dual-screw movement converter, in which a movement converter between a drive organ includes a screw fixed in translation and driven in rotation, having threads, a nut connected in translation to the receptor organ, having first threads engaging with the threads of the screw and second threads. A sleeve coaxially surrounds the nut, fixed in rotation and translation with respect to the screw and having threads with which the second threads of the nut engage. To the nut, slaved by its second threads to the threads of the sleeve, screw communicates a combined movement of rotation and translation whose translation component along an axis is transmitted to the receptor organ.

4 Claims, 4 Drawing Sheets

DUAL-SCREW MOVEMENT CONVERTER

RELATED APPLICATION INFORMATION

The present application claims priority to and the benefit of French patent application no. 1 459 870, which was filed in France on Oct. 15, 2014, the disclosure of which is incorporated herein by reference.

FIELD OF THE INVENTION

The present invention concerns a screw-operated movement converter connecting a drive organ to a receptor organ to transform the rotational movement of the drive organ, for example, equipped with a motor or reduction-gear motor, into a translational movement in one or the other direction applied to the receptor organ.

BACKGROUND INFORMATION

There exist a number of movement conversion devices that transform a rotational movement into a translational movement, such as a connecting rod and crank mechanism. But the structure of known converters is, in general, relatively complex or bulky.

SUMMARY OF THE INVENTION

An object of the present invention is to develop a simple, screw-operated movement converter that can be easily incorporated into a very crowded environment such as, for example, in automobile accessories or actuators.

To that end, the object of the invention is a screw-operated movement converter between a drive organ and a receptor organ, characterized in that it comprises a threaded screw rotating about its axis, fixed in translation and rotationally driven, a nut translationally connected to the receptor organ, having first threads engaging with the threads of the screw and second threads, a sleeve coaxially surrounding the nut and rotationally and translationally fixed with respect to the screw and having internal threads with which the second threads of the nut engage, the rotationally driven screw communicating with the nut slaved by its second threads to the threads of the sleeve, a combined movement of rotation and translation whose translation component along the axis is transmitted to the receptor organ.

The extremely simple movement converter of very reduced size according to the invention can be used to efficiently transform a movement of rotation into a movement of translation.

According to a particular characteristic, the length of the second threads of the nut is less than a half-turn. This enables the number of threads and second threads on the nut to be multiplied so as to absorb or transmit the considerable forces distributed over a certain number of threads, for example, two symmetrical threads with respect to the axis of the converter or three symmetrical threads in rotation with respect to the axis of the converter. Additionally, because the second threads that cooperate with the threads on the sleeve are of reduced length, limited to a thread segment, this enables the exterior contour of the thread segment to be adapted to threads of variable pitch to ensure good contact between the second threads, even in the form of a segment, and the interior threading of the sleeve.

According to another advantageous characteristic, the exterior threads consist of one or more thread segments of variable pitch. Specifically, in this case, it is of note that the length of the second threads of the nut is less than the length of a half-turn of the threads and that their exterior shape is curved to adapt to thread pitch variations while also having a significant contact surface.

According to another advantageous characteristic, the converter, the second threads of the nut have the shape of a curvilinear parallelogram whose slightly curved large sides are connected by short sides of variable high curvature, which is especially suitable for variable pitch threads.

According to another advantageous characteristic, the grooved threading of the sleeve has a variable pitch and the second threads of the nut have an elongated shape whose length is less than the smallest width of the groove projected onto a plane perpendicular to the axis and whose width is at most equal to the smallest width of the groove, the large sides of the threading serving as a support in those portions of the threading with small pitch and the small sides ensuring that the threading makes contact in the groove is in the sectors with large pitch, in which pitch variations are absorbed by the small curved sides of the threads.

Another object of the invention is a pressure generator having a converter, characterized in that it includes a cylinder housing at least one piston displaced in translation by the nut of the converter comprising a central screw and a sleeve cooperating with the nut by pairs of threads.

The invention also applies to a pressure-sensitive module having a dual-screw movement converter and receiving the pressure found in a circuit, characterized in that it consists of a module formed from a housing with a cylinder forming a chamber connected to the pressure circuit and closed by a piston screwed into a threaded cylinder of a pushrod, the piston being rotationally fixed but free in translation and the pushrod being equipped with exterior threads cooperating with the interior threads of the cylinder, the pushrod resting against a compression and torsion spring that receives the energy of torsion and compression transmitted by the pushrod displaced by the piston as a result of the pressure found in the chamber.

According to another advantageous characteristic, a pressure-sensitive module, characterized in that the interior threading of the cylinder accommodating the exterior threading of the pushrod has at least two portions, one with straight threads parallel to the axis and the other with small pitch threads.

Thus, the invention can be used to realize highly efficient devices for controlling actuators carrying out a translational movement or using a translational movement, especially in an environment that only accommodates very reduced bulk, such as, for example, the integration of actuators in automotive equipment.

The present invention will be described in greater detail by using examples of dual-screw movement converters as shown in the accompanying drawings.

DETAILED DESCRIPTION

Figure 1:
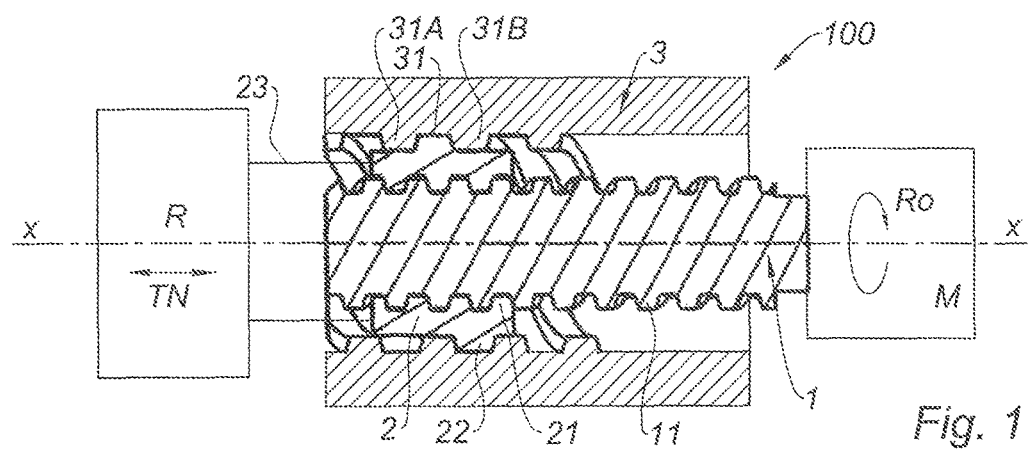
FIG. 1 is an axial cutaway of a dual-screw movement converter.

FIG. 1 shows dual-screw movement converter device 100 connecting drive organ M to receptor organ R. Drive organ M supplies a rotational drive movement (Ro) to displace receptor organ R in translation (Tr) in the direction of axis XX. The assembly is rotationally symmetrical around the XX axis.

Converter 100 consists of screw 1 with axis XX fixed in translation but free to rotate; it is rotationally driven by drive organ M. Threads on screw 1 engage with threads 21 on nut 2 translationally connected to receptor organ (R) by connector organ 23, which transmits the translational movement but not the rotational movement of nut 2.

Nut 2 is surrounded by sleeve 3, coaxial to axis XX. It is rotationally and translationally fixed. The rotation of screw 1 is a rotation with respect to sleeve 3 considered as fixed. But the rotation is relative and applied to nut 2, which is mobile with respect to screw 1 and to sleeve 3 in such a way that, in reality, only the algebraic difference in the speed of rotation of screw 1 with respect to sleeve 3 is of consequence. The latter can turn with an algebraic speed of rotation R1 and screw 1 has an algebraic speed of rotation RO, so that the speed of rotation applied to nut 2 will be a function of the helix angle of each thread.

Sleeve 3 has interior threading 31 with which second threading 22 of nut 2, which is an exterior threading, engages. Interior threading 31 of sleeve 3 has screw threads delimited by two threads, 31A, 31B, to guide threads 22 of nut 2. This (22) consists solely of a thread section extending for less than one turn and, which may be, over less than half a turn of nut 2 to reduce size through use of nut 2 whose length is significantly shorter than that of screw 1, representing the maximum translational travel needed to displace receptor R. But the contact surface is sufficiently large between the threads (31A, 31B) bordering interior threads 31 and threads 22 to transmit significant forces.

Figure 1A:
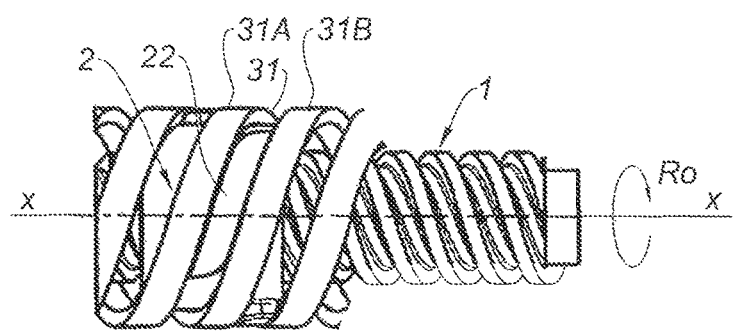
FIG. 1A is a simplified side view of the screw-operated movement converter of FIG. 1.

The side view of FIG. 1A shows only threads 31A, 31B bordering screw threads 31 of sleeve 3 without the body of the sleeve in order to reveal threads 22 of nut 2 guided on two sides between threads 31A, 31B; threads 22 are a segment whose length is less than a half-perimeter of nut 2, which is represented by the shaded area of FIG. 1A.

Figure 2:
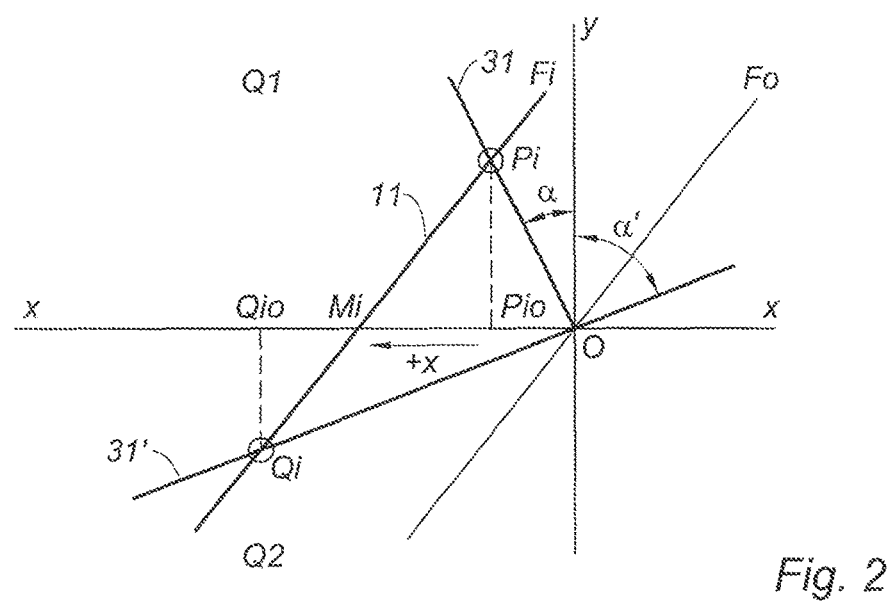
FIG. 2 is the schematic development in a plane of the dual-screw converter of FIG. 1.

FIG. 2 is a diagram in a plane (that of the figure) to describe the operation of dual-screw movement converter 100 of FIG. 1.

According to the representation and with an orientation corresponding to that of FIG. 1, axis XX is the axis of screw 1, whose threading 11, with path F, corresponds to the slope of the threads in their representation in the plane of FIG. 2. Axis XX serves to define the axial position of the current point Mi of threading 11 of screw 1. Axis YY, which passes through the origin, O, of the coordinate system, is used to locate the slope of threads 11 and 31.

Threading 11 displaces its current point Mi with threading 21 of nut 2 along axis XX. Current point Mi, intersecting with axis XX, also represents the theoretical position of nut 2 when driven by screw 1 if the nut were fixed in rotation but free in translation.

Because second or exterior threading 22 of nut 2 must follow fixed threading 31 of sleeve 3, current point Pi of this engagement is displaced along the evolution in the plane of threads 31 of sleeve 3 and represented by a single line (not the line of threads 31A, 31B, in order to avoid complicating the drawing).

Because nut 2 has current point Mi for its engagement with screw 1, current point Pi is situated along the moving evolution Fi of the threads of screw 1.

Current point Pi has a projection Pio on axis OX, which represents, to within a constant, the measurement of the displacement of receptor R with respect to origin O. As in this example, threads 11 and 31 have opposite directions, current point Pio moves slower than current point Mi of screw 1. By convention, movement occurs in the direction (+X) for this rotation (+Ro) of screw 1.

For a rotation in the opposite direction (−Ro) of screw 1, current point Pi moves to the right (as shown in FIG. 2) in the direction (−X) in such a way that the displacement of current point Pio, representing receptor R, will be ahead of current point Mi of screw 1.

According to the example of FIGS. 1, 1A, threads 22, 31 have opposite directions, in such a way that the rotation (Ro) of screw 1 pushes nut 2, whose threads 21 are slaved to internal threads 31 of sleeve 3, which they must thus follow.

The dual-thread converter (11, 21; 22, 31) induces in nut 2 a translational movement and a rotational movement:
screw 1 causes nut 2 to advance, whereas
threads 31, whose direction is opposite that of threads 11, cause nut 2 to turn in the opposite direction, corresponding to a reversal of nut 2 such that the combined output movement, applied to receptor R, is reduced, that is, is less than the advance that screw 1 alone would produce.

In other words, the movement of translation resulting from nut 2 is reduced with respect to the movement of nut 2 if this is rotationally fixed.

Conversely, in the case of threads 31, opposite in direction to those shown in FIGS. 1, 1A, nut 2 advances more rapidly than if it were to cooperate solely with screw 1 if it were rotationally fixed.

In the diagram, the distance OPi is representative of the movement of nut 2 along threads 31, and the distance OPio represents the translation of receptor R, transmitted by connector organ 23. Finally, distance MiPi represents the evolution of the movement of rotation of nut 2. Threads 31 make an angle (alpha), positive by convention, with respect to the YY axis, so that current point Pi is displaced in the first quadrant Q1 of coordinates XOY. Current point Pio (Pi) is delayed with respect to current point Mi if screw 1 turns in the direction (+Ro) shown, whereas for a rotation in the opposite direction (−Ro), current point Pio is in advance of current point Mi of screw 1.

FIG. 2 also shows, in quadrant Q2, the case for threading 31', having a "negative" slope (alpha') with respect to the YY axis.

In this case, for the same screw 1, current point Qi is projected onto Qio in advance of current point Mi for the direction of rotation (+Ro) and reciprocally.

Figure 3:
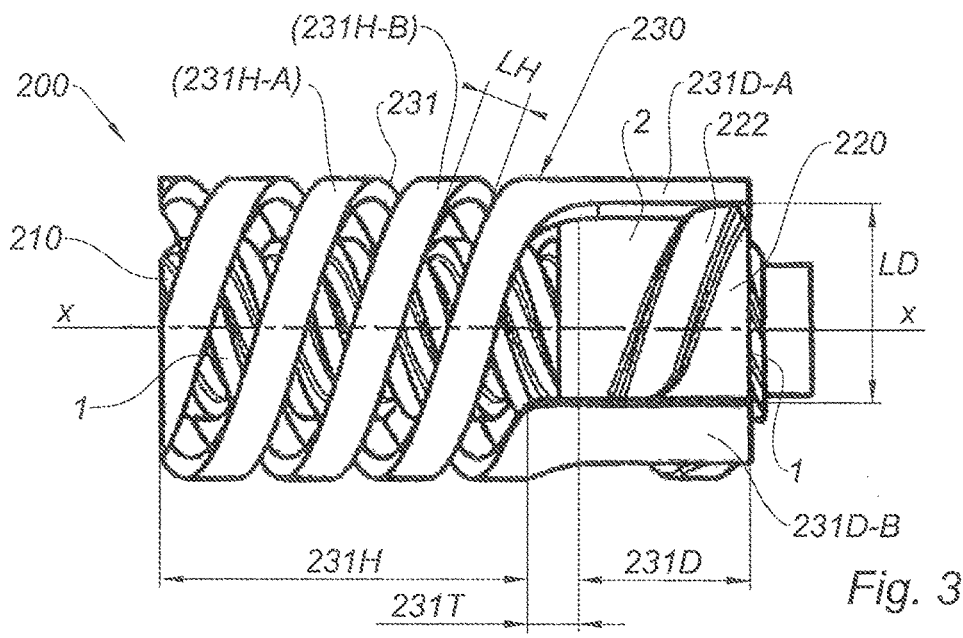
FIG. 3 is a schematic side view of a variant of the dual-screw movement converter of FIG. 1.

FIG. 3 shows an embodiment of converter 200 whose representation is limited to screw 210, nut 220, and sleeve 230. This embodiment of converter 200 differs from the previous in the particular shape of interior threads 231 of sleeve 230.

In effect, threads 231 are variable pitch threads composed of straight portion 231D, parallel to axis XX, together with helical portion 231H, for example, of constant pitch.

Width LD of straight portion 231D is the width of portion 231D projected onto a plane perpendicular to axis XX.

Width LH of helical portion 231H is the distance of the width of threads 231 in the direction perpendicular to the direction of threads 231.

Figure 3A:
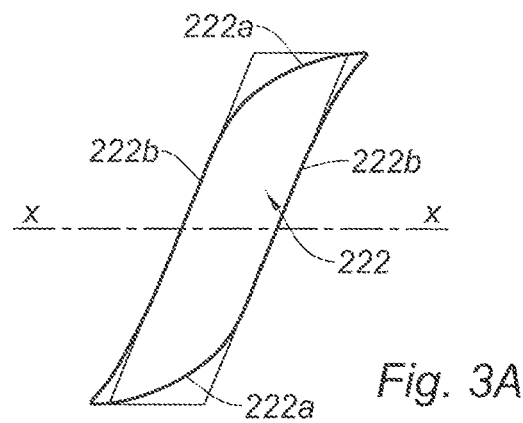
FIG. 3A is a separate view of the exterior threading of the nut.

Width LD is the greatest length possible of thread segment 222 and width LH is the greatest width possible of thread segment 222; threading 222 is thus inscribed in a curvilinear parallelogram (FIG. 3A).

FIG. 3 shows thread 222 of nut 2 circulating in straight portion 231D, being supported in its small side(s) 222a against sides 231D/A or B of portion 231D (see also FIG. 3A).

The junction between straight portion 231D of threads 231 and its helical portion, 231H, is realized by transitional portion 231T, which is very short and of high curvature, appreciably corresponding to the passage of straight portion 231D of threads 231 "with infinite pitch" to the helical portion 231H of threads 231 "with finite pitch," the transitional portion 231T causing, very schematically, thread segment 222 to transition from making contact with threads 231 by its small sides 222a to making contact by its large sides 222b (FIG. 3A). In the case of threads 231B, with constant pitch, contact with threading 222 occurs along a significant length of the segment, whereas in the case of threads 231B, with variable pitch, contact is more limited, primarily to absorb variations in curvature, large sides 222b themselves having a concave/convex curvature.

Figure 3C:
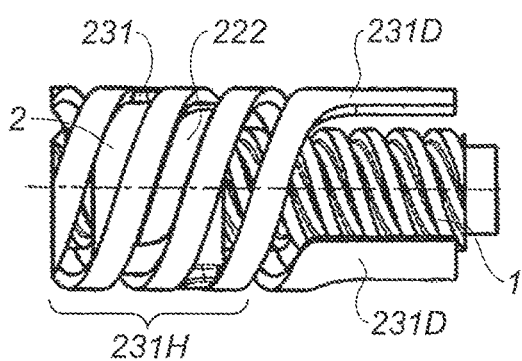
FIGS. 3B and 3C are side views of two stages of operation of the converter of FIG. 3.
Figure 3B:
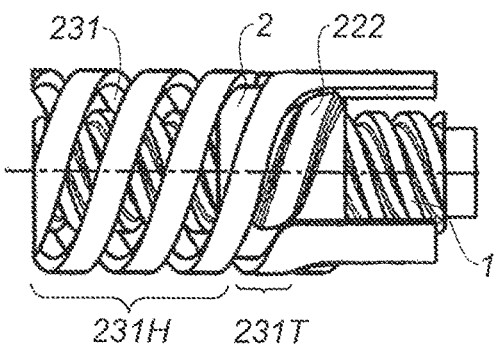

FIG. 3B shows threading 222 moving along transitional portion 231T at the start of its engagement with helical portion 231H.

FIG. 3C shows threading 222 moving along helical portion 231H while making contact by either of its large sides 222b with sides 231H-A or 231H-B of threading 231 (see FIGS. 3, 3A for reference details).

Figure 4:
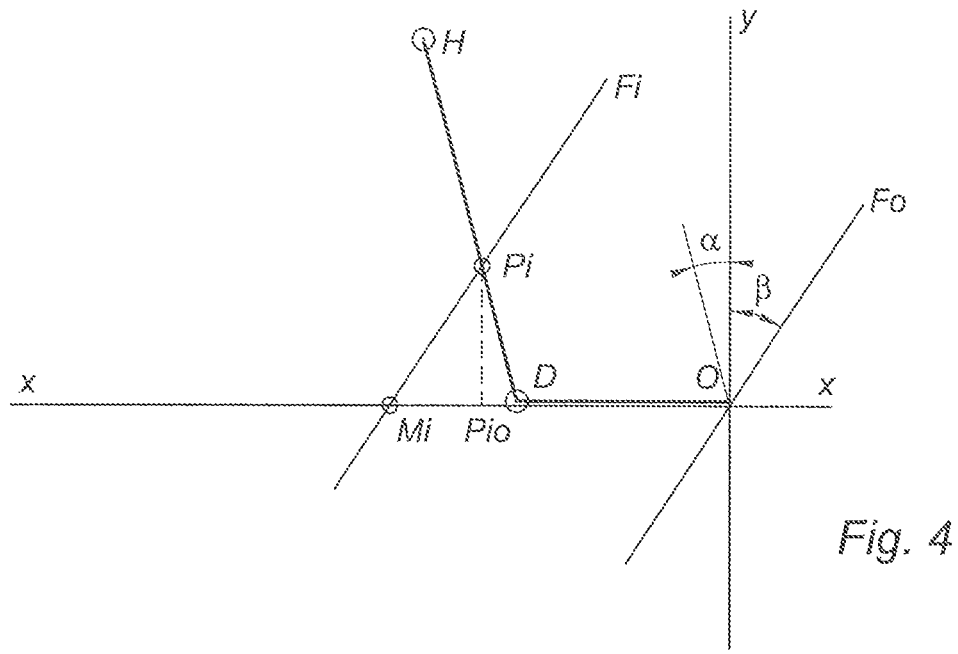
FIG. 4 is the evolution in a plane of the converter of FIG. 3.

FIG. 4 shows the evolution in the plane of the dual-screw converter of FIG. 3 using a representation analogous to that of FIG. 2 but for threading 231, which has straight portion 231D, corresponding to segment OD on axis XX, and helical portion 231H, corresponding to segment DH. Threading 11 is represented by the current straight line, Fi, passing through current point Mi.

Threads 222, being parallel to threads 231, both along their straight portion 231D and along their helical portion 231H, are represented by current point Pi at the intersection of current straight line Fi and the evolution of threads 231 (segment DH).

The current point of receptor R is the projection Pio of current point Pi along axis XX, which, in the case of the slopes of threads 11, 231 in the example, is delayed with respect to current point Mi for a displacement of current threading Fi to the left, which corresponds to a given direction of rotation of screw 1.

For the opposite rotation, current point Pio is in advance of current point Mi.

It should be noted that, to simplify the evolution, the transitional portion of the thread segment has not been shown in FIG. 4 at the junction of segments OD and DH.

Figure 5:
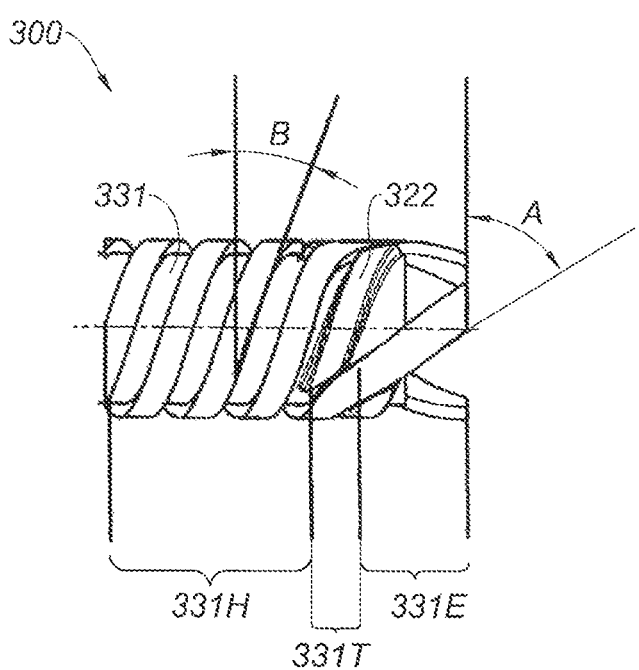
FIG. 5 is a schematic side view of another variant of the dual-screw movement converter according to the invention.

FIG. 5 is a schematic representation of another example of dual-screw converter 300, whose representation is limited to threads 322 of nut 2 and threads 331 of the sleeve, which is not shown in detail.

Threads 331 have an entrance portion 331E with a large pitch, followed by transitional portion 331T, which rejoins helical portion 331H with a small pitch.

Threads 322 of the nut are limited to a segment having the shape of a curvilinear parallelogram either of whose small sides make contact with the unreferenced sides of entrance portion 331E of threads 331 as well as in transitional portion 331T, whereas the large sides make contact with the sides of portion 331H of threads 331.

Evolution in the plane of this dual-screw convertor 300 has an evolution like that of FIG. 4, except that the segment representing entrance portion 331E is not aligned along axis XX but inclined at a low angle with respect to this axis, which corresponds to a helix with a very large pitch, being followed by a more sharply inclined segment corresponding to transition 331T and then an inclined segment comparable to that of segment DH of FIG. 4, because, according to this example, helical portion 331H has a pitch identical or similar to that of portion 231H of the embodiment of FIGS. 3, 4. The helix angles of threads 331 are shown by A and B.

In the case of converter 300, the translation component is initially strong for portion 331E, while being less strong than for portion 231D of the embodiment of FIG. 3, and then evolves, as with portion 231H of the embodiment of that same FIG. 3.

Figure 6:
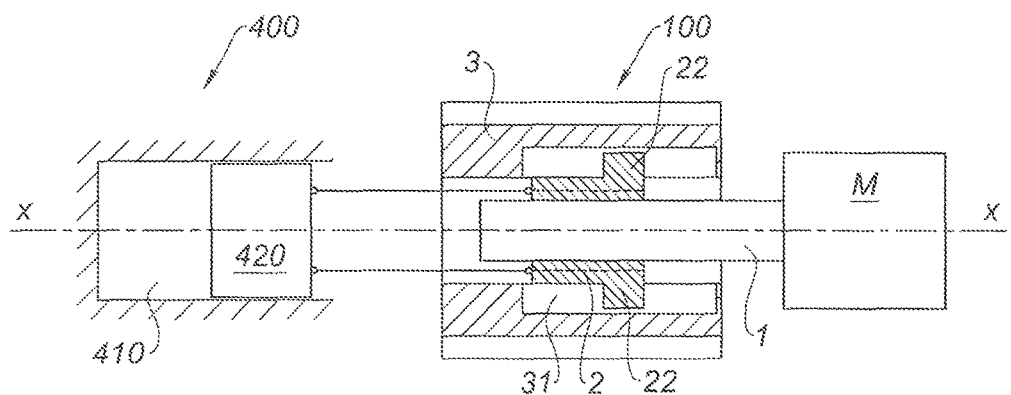
FIG. 6 is an axial cutaway of an embodiment of a thrust actuator of a dual-screw movement converter according to the invention, with a pressure emitter.

FIG. 6 shows the integration of dual-screw movement converter 100 in pressure generator 400, represented very schematically by cylinder 410 housing piston 420 displaced in translation by nut 2 of said converter 100 comprising central screw 1 and sleeve 3 cooperating with nut 2 by the thread pairs, as described above.

In this example, sleeve 3 has threads 31 in relief in two portions, the first, straight portion, or entrance portion, of which causes nut 2 and, thus, piston 420 to advance rapidly, while the second, helical portion produces a slower advance of piston 420, always for the same speed of rotation of motor M.

Figure 7:
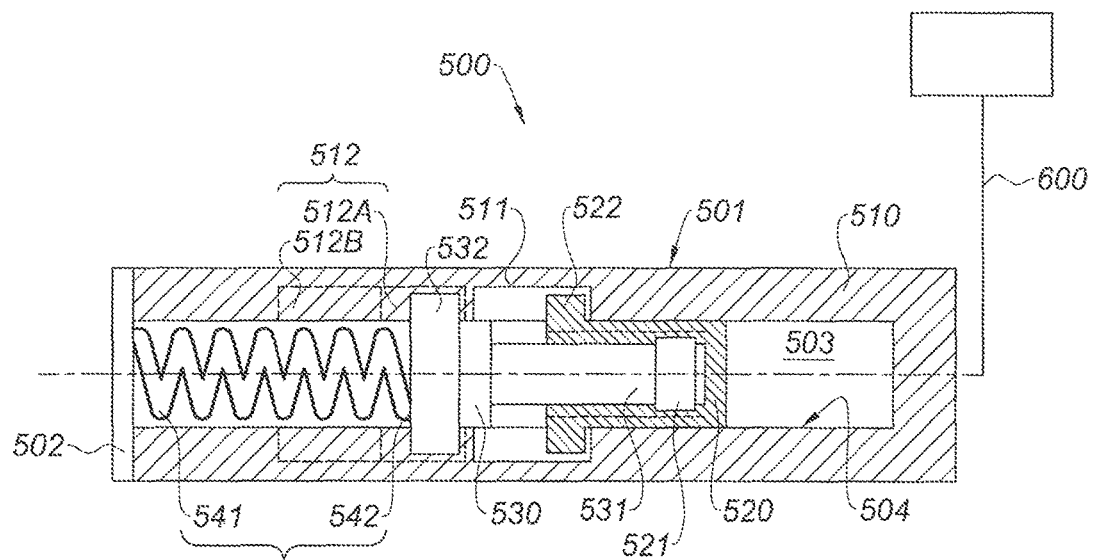
FIG. 7 is an axial cutaway of a pressure receptor with a movement converter.

This means that greater pressures can be generated than in known systems or, more generally, the combination of parameters can be optimized:
 power or motor torque
 hydraulic pressure in the chamber
 pressure buildup time FIG. 7 shows module 500, which is sensitive to the pressure found in circuit 600, such as a brake circuit.

Module 500 consists of housing 501 with cylinder 510 forming chamber 503 connected to pressure circuit 600. Chamber 503 is closed by piston 520 guided in borehole 504 of housing 501. Piston 520 has interior threads 521 into which is screwed threaded cylinder 531 of pushrod 530, which is also guided within borehole 504.

Piston 520 has at least one exterior lug sliding in longitudinal groove 511 of cylinder 510, while being fixed in rotation but free in translation along axis XX of borehole 504.

Piston 520 is equipped with seals, which are not shown, providing a seal for chamber 503.

Pushrod 530 is equipped with exterior threads 532 received by interior threads 512 of cylinder 510. Interior threads 512 may, for example, have several portions, especially, two portions, one, 512A, having straight threads parallel to axis XX or threads with a very large pitch, and the other, 512B, having threads with a small pitch, similar to that found on ordinary threads.

Pushrod 530 makes contact with compression spring 540, which makes contact with back 502 of housing 501 and, at its other extremity, 542, with pushrod 530.

Thus, when piston 520 is pushed by the pressure found in chamber 503, it pushes pushrod 530, which is forced to follow, due to its exterior threading, 532, the movement imposed by threads 512 of cylinder 510 and, at the same time, the movement imposed by threads 521 of piston 520 upon exterior threads 532 in such a way that spring 540 experiences a compressive movement until an equilibrium point is reached with the pressure in circuit 600.

The choice of characteristics of spring 540 and the two thread pairs 521, 531, and 532, 512, can be used to determine the pressure found in circuit 600 for a volume of liquid displaced, based upon portions 512A, 512B.

In short, the force exerted by screw-piston 520 pushes pushrod 530 in translation and in rotation by following threads 512 of cylinder 510.

The movement of pushrod 530 is transmitted to spring 540, which accumulates this compressive energy to then release it to screw-piston 520 or maintain the equilibrium pressure in circuit 600, depending on the characteristics of spring 540.

In the above examples (and without multiplying the reference numbers for each example), it is advantageous to multiply threads 31 of sleeve 3 with parallel marks and to have as many threads 22 on nut 2. In particular, it is advantageous to equilibrate the dual-screw converter by redistributing the forces transmitted by the nut to the receptor as uniformly as possible throughout the entire periphery of the nut.

These remarks apply to the different embodiments described above. Thus, and as an example of FIGS. 1, 1A, 3, 5, we note that the threads of the sleeve are tripled and the exterior threads of the nut are as well. The second and third exterior threads of the nut are formed, like the first, by a segment in the shape of a curvilinear parallelogram whose length is less than one-third of a thread turn. The third exterior threads are located behind the nut in the various drawings. However, the alignment of the groove shows that there are three parallel grooves.

What is claimed is:

1. A screw-operated movement converter to convert between a movement of a drive element and a movement of a driven element, the converter comprising:
    a screw having an axis of rotation, fixed in translation and driven in rotation, and having threads;
    a nut connected in translation to the driven element and having first threads engaging with the threads of the screw and second threads; and
    a sleeve coaxially surrounding the nut and fixed in rotation and in translation with respect to the screw and having threads with which the second threads of the nut engage;
    wherein the screw, driven in rotation, communicates to the nut, slaved by the second threads to the threads of the sleeve, a combined movement of rotation and translation whose translation component along the axis of rotation is transmitted to the driven element;
    wherein the second threads of the nut have a length less than one half-turn; and
    wherein the first threads of the nut are interior threads and the screw has corresponding exterior threads.

2. A screw-operated movement converter to convert between a movement of a drive element and a movement of a driven element, the converter comprising:
    a screw having an axis of rotation, fixed in translation and driven in rotation, and having threads;
    a nut connected in translation to the receiver element and having first threads engaging with the threads of the screw and second threads; and
    a sleeve coaxially surrounding the nut and fixed in rotation and in translation with respect to the screw and having threads with which the second threads of the nut engage;
    wherein the screw, driven in rotation, communicates to the nut, slaved by the second threads to the threads of the sleeve, a combined movement of rotation and translation whose translation component along the axis of rotation is transmitted to the driven element;
    wherein the threads of the sleeve are composed of one or more thread segments of different pitch.

3. A screw-operated movement converter to convert between a movement of a drive element and a movement of a driven element, the converter comprising:
    a screw having an axis of rotation, fixed in translation and driven in rotation, and having threads;
    a nut connected in translation to the driven element and having first threads engaging with the threads of the screw and second threads; and
    a sleeve coaxially surrounding the nut and fixed in rotation and in translation with respect to the screw and having threads with which the second threads of the nut engage;
    wherein the screw, driven in rotation, communicates to the nut, slaved by the second threads to the threads of the sleeve, a combined movement of rotation and translation whose translation component along the axis of rotation is transmitted to the driven element;
    wherein the second threads of the nut have a length less than one half-turn; and
    wherein the second threads of the nut have the shape of a curvilinear parallelogram having first sides connected by second sides, wherein the first sides are larger than the second sides, the first sides are curved, and the second sides have a variable curvature.

4. A pressure sensitive module, comprising:
    a housing with a first cylinder forming a chamber connected to a pressure circuit, the chamber being closed by a piston, the piston has interior threads and into which is screwed a threaded second cylinder of a pushrod, the piston being fixed in rotation but free in translation and the pushrod being equipped with exterior threads cooperating with interior threads of the first cylinder, the pushrod resting against a compression spring which receives compressive energy transmitted by the pushrod displaced by the piston through the effect of pressure in the chamber;
    wherein the interior threads of the first cylinder receiving the exterior threads of the pushrod have at least two portions, one of the at least two portions having straight threads parallel to the axis and the other of the at least two portions having threads with a small pitch.

* * * * *